US007003507B2

(12) United States Patent
Tip et al.

(10) Patent No.: US 7,003,507 B2
(45) Date of Patent: Feb. 21, 2006

(54) SCALABLE PROPAGATION-BASED METHODS FOR CALL GRAPH CONSTRUCTION

(75) Inventors: Frank Tip, Mount Kisco, NY (US); Jens Palsberg, West Lafayette, IN (US)

(73) Assignee: International Business Machines Corporation, Armonk, NY (US)

(*) Notice: Subject to any disclaimer, the term of this patent is extended or adjusted under 35 U.S.C. 154(b) by 746 days.

(21) Appl. No.: 09/823,060

(22) Filed: Mar. 30, 2001

(65) Prior Publication Data

US 2003/0018603 A1    Jan. 23, 2003

Related U.S. Application Data

(60) Provisional application No. 60/233,591, filed on Sep. 18, 2000.

(51) Int. Cl.
 *G06F 17/30* (2006.01)
(52) U.S. Cl. ......................................... 707/2; 717/133
(58) Field of Classification Search ............... 707/2; 717/131, 132, 116–157, 130, 133; 711/202; 345/440
 See application file for complete search history.

(56) References Cited

U.S. PATENT DOCUMENTS

| | | | | |
|---|---|---|---|---|
| 5,428,793 | A * | 6/1995 | Odnert et al. ................ | 717/157 |
| 5,671,419 | A * | 9/1997 | Carini et al. ................. | 717/145 |
| 5,933,640 | A * | 8/1999 | Dion ........................... | 717/132 |
| 5,963,740 | A * | 10/1999 | Srivastava et al. .......... | 717/130 |
| 6,041,179 | A * | 3/2000 | Bacon et al. ................ | 717/116 |
| 6,240,500 | B1 * | 5/2001 | Scales ......................... | 711/202 |
| 6,282,707 | B1 * | 8/2001 | Isozaki ........................ | 717/157 |
| 6,546,551 | B1 * | 4/2003 | Sweeney et al. ............. | 717/154 |
| 6,654,951 | B1 * | 11/2003 | Bacon et al. ................ | 717/154 |
| 6,665,865 | B1 * | 12/2003 | Ruf ............................. | 717/157 |
| 2002/0010911 | A1 * | 1/2002 | Cheng et al. ................. | 717/4 |
| 2003/0172135 | A1 * | 9/2003 | Bobick et al. .............. | 709/220 |

OTHER PUBLICATIONS

Shivers, O. *Control-Flow Analysis of Higher-Order Languages*. PhDthesis, CMU,May, 1991. CMU-CS-91-145.

Bacon, D.F., and Sweeney, P.F. Fast static analysis of C++ virtual function calls. In *Proceedings of the Eleventh Annual Conference on Object-Oriented Programming Systems, Languages, and Applications (OOPSLA '96)* (San Jose, CA, 1996), pp. 324-341. *SIGPLAN Notices* 31(10).

Bacon, D.F. *Fast and Effective Optimization of Statically Typed Object-Oriented Languages*. PhD thesis, Computer Science Division, University of California, Berkeley, Dec. 1997. Report No. UCB/CSD-98-1017.

Dean, J., Grove, D., and Chambers, C. Optimization of object-oriented programs using static class hierarchy analysis. In *Proceedings of the Ninth European Conference on Object-Oriented Programming (ECOOP'95)* (Aarhus, Denmark, Aug. 1995), W. Olthoff, Ed., Springer-Verlag, pp. 77-101.

(Continued)

*Primary Examiner*—Uyen Le
(74) *Attorney, Agent, or Firm*—Casey P. August; Jon A. Gibbons; Fleit, Kain, Gibbons, Gutman, Bongini & Bianco P.L.

(57) ABSTRACT

A program storage device, readably by a machine, tangibly embodying instructions to perform method steps for constructing a call graph whereby for each method M, a set of types $S_M$ of objects that may occur in method M is determined for each field F, a set of types $S_F$ of objects is determined that may be stored in field F, the method comprising: determining the allocation sites inside the body of method M; determining the set of directly called methods M' inside the body of method M; and determining the set of virtually called methods M" inside the body of method M.

18 Claims, 6 Drawing Sheets

OTHER PUBLICATIONS

Palsberg, J., and Schwartzbach, M. *Object-Oriented Type Systems*, John Wiley & Sons, 1993.

Tip, Frank and Palsberg, Jens, "Scalable Propagation-Based Cell Graph Construction Algorithms," In *Proceedings of the Fifteenth Annual Conference on Object-Oriented Programming Systems, Languages, and Applications* (OOPSLA'00), Minneapolis, MN, Oct. 15-19, 2000, pp. 281-293. Appeared in ACM SIGPLAN Notices 35(10).

* cited by examiner

| BENCHMARK | # CLASSES | # METHODS | # FIELDS (REFERENCE-TYPED) | # VIRTUAL CALL SITES |
|---|---|---|---|---|
| Hanoi | 44 | 379 | 232 (107) | 285 |
| Ice Browser | 76 | 761 | 500 (253) | 922 |
| mBird | 2,050 | 17,956 | 6739 (4284) | 3,269 |
| Cindy | 468 | 4,449 | 3075 (1677) | 5,085 |
| CindyApplet | 468 | 4,449 | 3075 (1677) | 2,502 |
| eSuite Sheet | 588 | 5,590 | 4305 (1412) | 4,459 |
| eSuite Chart | 733 | 8,302 | 5448 (2141) | 8,074 |
| javaFig 1.43 | 161 | 2,108 | 1526 (971) | 3,482 |
| BLOAT | 282 | 2,677 | 1255 (541) | 6,623 |
| JAX 6.3 | 309 | 2,754 | 1252 (579) | 3,836 |
| javac | 210 | 1,512 | 1107 (406) | 3,621 |
| Res. System | 2,332 | 21,495 | 12487 (6334) | 23,640 |

| BENCHMARK | RTA | MTA | | FTA | | XTA | |
|---|---|---|---|---|---|---|---|
| | # types | # types | # types/method (avg) | # types | # types/method (avg) | # types | # types/method (avg) |
| Hanoi | 19 | 19 | 7.1  37.3% | 19 | 3.8  20.0% | 19 | 2.8  14.8% |
| Ice Broser | 59 | 59 | 23.4  39.7% | 59 | 7.1  12.0% | 59 | 4.5  7.7% |
| mBird | 178 | 178 | 90.0  50.6% | 178 | 13.3  7.5% | 178 | 11.6  6.5% |
| Cindy | 238 | 237 | 153.2  64.6% | 237 | 36.5  15.4% | 237 | 28.3  11.9% |
| CindyApplet | 105 | 104 | 64.6  62.1% | 104 | 17.2  16.5% | 104 | 13.9  13.4% |
| eSuite Sheet | 174 | 174 | 96.0  55.2% | 174 | 21.1  12.1% | 174 | 13.8  7.9% |
| eSuite Chart | 303 | 303 | 224.1  74.0% | 303 | 48.6  16.0% | 303 | 24.0  7.9% |
| javaFig 1.43 | 110 | 110 | 73.4  66.7% | 110 | 21.2  19.3% | 110 | 17.1  15.5% |
| BLOAT | 209 | 209 | 163.8  78.4% | 209 | 44.7  21.4% | 209 | 42.4  20.3% |
| JAX 6.3 | 221 | 221 | 70.9  32.1% | 221 | 10.0  4.5% | 221 | 8.3  3.8% |
| javac | 171 | 171 | 106.4  62.2% | 171 | 39.9  23.3% | 171 | 35.5  20.8% |
| Res. System | 1,174 | 1174 | 833.8  71.0% | 1172 | 228.2  19.5% | 1172 | 200.0  17.1% |
| AVERAGE | | | 57.8% | | 15.6% | | 12.3% |

*FIG. 3* 300

| BENCHMARK | RTA | MTA | FTA | XTA | MTA/RTA | FTA/RTA | XTA/RTA |
|---|---|---|---|---|---|---|---|
| Hanoi | 0.2 | 1.1 | 1.0 | 1.2 | 5.5 | 5.0 | 6.0 |
| Ice Browser | 0.4 | 1.7 | 2.4 | 2.1 | 4.3 | 6.0 | 5.3 |
| mBird | 1.1 | 4.8 | 5.2 | 5.8 | 4.4 | 4.7 | 5.3 |
| Cindy | 2.0 | 10.8 | 8.7 | 9.3 | 5.4 | 4.4 | 4.7 |
| CindyApplet | 0.7 | 3.0 | 2.4 | 2.6 | 4.3 | 3.4 | 3.7 |
| eSuite Sheet | 1.5 | 5.4 | 6.4 | 6.9 | 3.6 | 4.3 | 4.6 |
| eSuite Chart | 7.0 | 33.0 | 24.3 | 19.9 | 4.7 | 3.5 | 2.8 |
| javaFig 1.43 | 0.8 | 3.4 | 4.5 | 4.9 | 4.3 | 5.6 | 6.1 |
| BLOAT | 1.8 | 13.1 | 7.9 | 8.7 | 7.3 | 4.4 | 4.8 |
| JAX 6.3 | 1.2 | 3.4 | 3.2 | 3.5 | 2.8 | 2.7 | 2.9 |
| javac | 1.2 | 12.1 | 8.9 | 10.0 | 10.1 | 7.4 | 8.3 |
| Res. System | 44.5 | 329.4 | 309.1 | 250.2 | 7.4 | 6.9 | 5.6 |
| AVERAGE | | | | | 5.3 | 4.9 | 5.0 |

*FIG. 8* 800

| BENCHMARK | RTA | MTA | FTA | XTA | (RTA-MTA)/RTA | (RTA-FTA)/RTA | (RTA-XTA)/RTA |
|---|---|---|---|---|---|---|---|
| Hanoi | 183 | 179 | 178 | 178 | 2.2% | 2.7% | 2.7% |
| Ice Browser | 644 | 644 | 643 | 643 | 0.0% | 0.2% | 0.2% |
| mBird | 1,862 | 1,855 | 1,825 | 1,824 | 0.4% | 2.0% | 2.0% |
| Cindy | 2,437 | 2,412 | 2,404 | 2,403 | 1.0% | 1.4% | 1.4% |
| CindyApplet | 1,237 | 1,209 | 1,203 | 1,202 | 2.3% | 2.7% | 2.8% |
| eSuite Sheet | 2,414 | 2,400 | 2,385 | 2,367 | 0.6% | 1.2% | 1.9% |
| eSuite Chart | 4,428 | 4,419 | 4,313 | 4,296 | 0.2% | 2.6% | 3.0% |
| javaFig 1.43 | 1,441 | 1,435 | 1,413 | 1,411 | 0.4% | 1.9% | 2.1% |
| BLOAT | 2,143 | 2,142 | 2,120 | 2,091 | 0.0% | 1.1% | 2.4% |
| JAX 6.3 | 1,900 | 1,894 | 1,894 | 1,892 | 0.3% | 0.3% | 0.4% |
| javac | 1,366 | 1,366 | 1,366 | 1,366 | 0.0% | 0.0% | 0.0% |
| Res. System | 11,232 | 11,227 | 11,204 | 11,201 | 0.0% | 0.2% | 0.3% |
| AVERAGE | | | | | 0.6% | 1.4% | 1.6% |

FIG. 4  400

| BENCHMARK | RTA | MTA | FTA | XTA | (RTA-MTA)/RTA | (RTA-FTA)/RTA | (RTA-XTA)/RTA |
|---|---|---|---|---|---|---|---|
| Hanoi | 400 | 386 | 382 | 379 | 3.5% | 4.5% | 5.3% |
| Ice Browser | 1,594 | 1,594 | 1,593 | 1,588 | 0.0% | 0.1% | 0.4% |
| mBird | 8,061 | 8,036 | 7,772 | 7,760 | 0.3% | 3.6% | 3.7% |
| Cindy | 15,457 | 14,729 | 11,331 | 10,967 | 4.7% | 26.7% | 29.0% |
| CindyApplet | 5,223 | 4,490 | 4,399 | 4,347 | 4.5% | 15.8% | 16.8% |
| eSuite Sheet | 7,171 | 7,149 | 7,093 | 7,071 | 0.3% | 1.1% | 1.4% |
| eSuite Chart | 14,669 | 14,648 | 13,857 | 13,771 | 0.1% | 5.5% | 6.1% |
| javaFig 1.43 | 5,128 | 5,064 | 4,963 | 4,961 | 1.2% | 3.2% | 3.3% |
| BLOAT | 19,384 | 18,772 | 16,704 | 16,672 | 3.2% | 13.8% | 14.0% |
| JAX 6.3 | 7,053 | 7,018 | 6,904 | 6,895 | 0.5% | 2.1% | 2.2% |
| javac | 13,154 | 13,154 | 13,115 | 13,113 | 0.0% | 0.3% | 0.3% |
| Res. System | 46,130 | 45,944 | 44,792 | 44,412 | 0.4% | 2.9% | 3.7% |
| AVERAGE | | | | | 1.6% | 6.6% | 7.2% |

FIG. 5  500

| BENCHMARK | RTA | | | MTA | | | FTA | | | XTA | | |
|---|---|---|---|---|---|---|---|---|---|---|---|---|
| | unreached | mono | poly | unreached | mono | poly | unreached | mono | poly | unreached | mono | poly |
| Hanoi | 34.0% | 61.6% | 4.4% | 34.0% | 62.3% | 3.7% | 34.0% | 62.7% | 3.3% | 34.0% | 62.7% | 3.3% |
| Ice BrowSer | 4.0% | 91.4% | 4.7% | 4.0% | 91.4% | 4.7% | 4.0% | 91.4% | 4.7% | 4.0% | 91.6% | 4.5% |
| mBird | 14.2% | 73.4% | 12.3% | 14.2% | 73.5% | 12.2% | 17.4% | 70.8% | 11.8% | 17.4% | 70.9% | 11.7% |
| Cindy | 49.3% | 45.0% | 5.7% | 49.5% | 45.0% | 5.5% | 49.4% | 45.2% | 5.4% | 49.4% | 45.5% | 5.0% |
| CindyApplet | 72.0% | 24.6% | 3.4% | 72.1% | 24.6% | 3.3% | 72.3% | 24.4% | 3.3% | 72.3% | 24.5% | 3.2% |
| eSuite Sheet | 28.1% | 68.4% | 3.5% | 28.1% | 68.4% | 3.5% | 28.1% | 69.1% | 2.8% | 28.2% | 69.1% | 2.8% |
| eSuite Chart | 13.3% | 76.6% | 10.1% | 13.3% | 76.6% | 10.1% | 15.7% | 75.7% | 8.7% | 15.7% | 76.0% | 8.3% |
| javaFig 1.43 | 9.1% | 87.1% | 3.9% | 9.1% | 87.4% | 3.6% | 9.7% | 87.2% | 3.1% | 9.7% | 87.2% | 3.1% |
| BLOAT | 6.6% | 82.4% | 11.1% | 6.6% | 82.4% | 11.1% | 6.7% | 82.5% | 10.8% | 7.0% | 82.2% | 10.8% |
| JAX 6.3 | 18.7% | 75.9% | 5.4% | 18.9% | 75.7% | 5.4% | 18.9% | 76.6% | 4.5% | 18.9% | 76.8% | 4.3% |
| javac | 3.0% | 77.6% | 19.4% | 3.0% | 77.6% | 19.4% | 3.0% | 77.6% | 19.4% | 3.0% | 77.7% | 19.3% |
| Res. System | 18.1% | 72.0% | 9.9% | 18.1% | 72.2% | 9.7% | 18.2% | 73.1% | 8.7% | 18.2% | 74.0% | 7.9% |
| AVERAGE | | | 7.8% | | | 7.7% | | | 7.2% | | | 7.0% |

| BENCHMARK | mono->unreached | | mono->mono | | poly->unreached | | poly->mono | | poly->poly | |
|---|---|---|---|---|---|---|---|---|---|---|
| Hanoi | 0 | (MTA) | 266 | (MTA) | 0 | (MTA) | 3 | (MTA) | 16 | (MTA) |
| | 0 | (FTA) | 266 | (FTA) | 0 | (FTA) | 5 | (FTA) | 14 | (FTA) |
| | 0 | (XTA) | 266 | (XTA) | 0 | (XTA) | 5 | (XTA) | 14 | (XTA) |
| Ice Browser | 0 | (MTA) | 877 | (MTA) | 0 | (MTA) | 0 | (MTA) | 45 | (MTA) |
| | 1 | (FTA) | 876 | (FTA) | 0 | (FTA) | 0 | (FTA) | 45 | (FTA) |
| | 1 | (XTA) | 876 | (XTA) | 0 | (XTA) | 0 | (XTA) | 43 | (XTA) |
| mBird | 0 | (MTA) | 2,807 | (MTA) | 0 | (MTA) | 4 | (MTA) | 448 | (MTA) |
| | 141 | (FTA) | 2,266 | (FTA) | 8 | (FTA) | 12 | (FTA) | 442 | (FTA) |
| | 141 | (XTA) | 2,266 | (XTA) | 8 | (XTA) | 16 | (XTA) | 438 | (XTA) |
| Cindy | 8 | (MTA) | 4,510 | (MTA) | 0 | (MTA) | 9 | (MTA) | 548 | (MTA) |
| | 11 | (FTA) | 4,507 | (FTA) | 0 | (FTA) | 24 | (FTA) | 543 | (FTA) |
| | 14 | (XTA) | 4,504 | (XTA) | 0 | (XTA) | 52 | (XTA) | 515 | (XTA) |
| CindyApplet | 8 | (MTA) | 2,185 | (MTA) | 3 | (MTA) | 12 | (MTA) | 294 | (MTA) |
| | 21 | (FTA) | 2,172 | (FTA) | 3 | (FTA) | 3 | (FTA) | 303 | (FTA) |
| | 25 | (XTA) | 2,168 | (XTA) | 3 | (XTA) | 14 | (XTA) | 292 | (XTA) |
| eSuite Sheet | 1 | (MTA) | 4,272 | (MTA) | 2 | (MTA) | 0 | (MTA) | 184 | (MTA) |
| | 1 | (FTA) | 4,272 | (FTA) | 2 | (FTA) | 45 | (FTA) | 139 | (FTA) |
| | 2 | (XTA) | 4,271 | (XTA) | 2 | (XTA) | 45 | (XTA) | 139 | (XTA) |
| eSuite Chart | 2 | (MTA) | 7,186 | (MTA) | 2 | (MTA) | 1 | (MTA) | 883 | (MTA) |
| | 209 | (FTA) | 6,979 | (FTA) | 32 | (FTA) | 100 | (FTA) | 754 | (FTA) |
| | 217 | (XTA) | 6,971 | (XTA) | 32 | (XTA) | 135 | (XTA) | 719 | (XTA) |
| javaFig 1.43 | 1 | (MTA) | 3,333 | (MTA) | 0 | (MTA) | 12 | (MTA) | 136 | (MTA) |
| | 23 | (FTA) | 3,311 | (FTA) | 2 | (FTA) | 26 | (FTA) | 120 | (FTA) |
| | 25 | (XTA) | 3,309 | (XTA) | 2 | (XTA) | 26 | (XTA) | 120 | (XTA) |
| BLOAT | 0 | (MTA) | 5,838 | (MTA) | 0 | (MTA) | 2 | (MTA) | 783 | (MTA) |
| | 26 | (FTA) | 5,812 | (FTA) | 0 | (FTA) | 20 | (FTA) | 765 | (FTA) |
| | 58 | (XTA) | 5,780 | (XTA) | 0 | (XTA) | 20 | (XTA) | 765 | (XTA) |
| JAX 6.3 | 11 | (MTA) | 3,571 | (MTA) | 0 | (MTA) | 2 | (MTA) | 252 | (MTA) |
| | 11 | (FTA) | 3,571 | (FTA) | 0 | (FTA) | 46 | (FTA) | 208 | (FTA) |
| | 11 | (XTA) | 3,571 | (XTA) | 0 | (XTA) | 55 | (XTA) | 199 | (XTA) |
| javac | 0 | (MTA) | 2,898 | (MTA) | 0 | (MTA) | 0 | (MTA) | 723 | (MTA) |
| | 0 | (FTA) | 2,898 | (FTA) | 0 | (FTA) | 0 | (FTA) | 723 | (FTA) |
| | 0 | (XTA) | 2,898 | (XTA) | 0 | (XTA) | 2 | (XTA) | 721 | (XTA) |
| Res. System | 4 | (MTA) | 20,797 | (MTA) | 2 | (MTA) | 48 | (MTA) | 2,789 | (MTA) |
| | 22 | (FTA) | 20,779 | (FTA) | 14 | (FTA) | 324 | (FTA) | 2,501 | (FTA) |
| | 23 | (XTA) | 20,778 | (XTA) | 15 | (XTA) | 569 | (XTA) | 2,255 | (XTA) |

*FIG. 7* 700

SCALABLE PROPAGATION-BASED METHODS FOR CALL GRAPH CONSTRUCTION

CROSS REFERENCE TO RELATED APPLICATIONS

This is non-provisional patent application is based on the provisional patent application Ser. No. 60/233,591 to Frank Tip et al, for "Scalable Propagation-Based Call Graph Construction Algorithms" filed Sep. 18, 2000, which is commonly assigned herewith to International Business Machines Corporation, and is hereby incorporated herein in its entirety by reference.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of object-oriented programming, specifically to the analysis and optimization of object-oriented programs, and in particular to the field call graph construction algorithms such as RTA (Rapid Type Analysis).

2. Description of the Related Art

A key task that is required by most approaches to whole-program optimization is the construction of a call graph approximation. Through use of a call graph, methods can be removed that are not reachable from the main method, dynamically dispatched method calls can be replaced with direct method calls, methods calls can be inlined when there is a unique target, and more sophisticated optimizations can be performed such as interprocedural constant propagation, object inlining, and transformations of the class hierarchy. In the context of object-oriented languages with dynamic dispatch, the crucial step in constructing a call graph is to compute a conservative approximation of the set of methods that can be invoked by a given virtual (i.e., dynamically dispatched) method call.

Call-graph construction algorithms have been studied intensively in the 1990s. While their original formulations use a variety of formalisms, most of them can be recast as set-based analyses. The common idea is to abstract an object into the name of its class, and to abstract a set of objects into the set of their classes. For any given call site e.m( ), the goal is then to compute a set of class names $S_e$ that approximates the run-time values of the receiver expression e. Once the sets $S_e$ are determined for all expressions e, the class hierarchy can be examined to identify the methods that can be invoked.

Most call graph construction algorithms differ primarily in the number of sets that are used to approximate run-time values of expressions. Examples:

| NUMBER OF SETS USED TO APPROXIMATE RUN-TIME VALUES OF EXPRESSIONS | ALGORITHM NAME |
| --- | --- |
| No Sets | Class Hierarchy Analysis (CHA)[9,10] |
| One set for the whole program | Rapid Type Analysis (RTA)[5,6] |
| One set per expression | O-CFA (Control-Flow Analysis)[17,33] |
| Several sets per expression | k-CFA, k > 0[17,33] |

Intuitively, algorithms that use more sets compute more precise call graphs, but need more time and space to do the construction. In practice, the scalability of the algorithms at either end of the spectrum is fairly clear. The CHA and RTA algorithms at the low end of the range scale well and are widely used. The k-CFA algorithms (for k>0) at the high end seem not to scale well at all.[17] The scalability of 0-CFA remains doubtful, mostly due to the large amounts of space required to represent the many different sets that arise. Recent work by Fähndrich et al. give grounds for optimism, although their recent results are obtained on a machine with 2,048 Megabytes of memory.[37] In the case of Java, another complicating factor for 0-CFA is that sets of class names need to be computed for locations on the run-time stack. Those locations are unnamed, and to facilitate 0-CFA, it seems necessary to first do a program transformation that names all the locations in some fashion, as done in various recent work.[21, 38, 41] Such transformations introduce both time and space overhead. With the investigation of the scalability of 0-CFA still pending, there is a need in the prior art to address the following:

Are there interesting design points in the space between RTA and 0-CFA?

Can better precision be achieved than RTA without analyzing values on the run-time stack?

Prior Art Algorithms

The following prior art algorithms progressively take more information into account when resolving virtual method calls.

1. Name-Based Resolution (RA)

Reachability Analysis (RA) is a simple algorithm for constructing call graphs that only takes into account the name of a method. (A slightly more advanced version of this algorithm relies on the equality of method signatures instead of method names. Variations of RA have been presented in many places and used in the context of tree-shakers for Lisp.[16, 34]

RA can be defined in terms of a set variable R (for "reachable methods") that ranges over sets of methods, and the following constraints, derived from the program text:
1. main R (main denotes the main method in the program)
2. For each method M, each virtual call site e.m ( . . . ) occurring in M, and each method M' with name m:

(M R)υ(M'R).

Intuitively, the first constraint reads "the main method is reachable," and the second constraint reads "if a method is reachable, and a virtual method call e.m( . . . ) occurs in its body, then every method with name m is also reachable." It is straightforward to show that there is a least set R that satisfies the constraints, and a solution procedure that computes that set. The reason for computing the least R that satisfies the constraints is that this maximizes the complement of R, i.e., the set of unreachable methods that can be removed safely.

Class Hierarchy Analysis (CHA)

The constraint system for RA can be extended to also take class hierarchy information into account. The result is known as class hierarchy analysis (CHA).[9,10] The following notation StaticType(e) is used to denote the static type of the expression e, SubTypes(t) to denote the set of declared subtypes of type t, and the notation StaticLookup(C, m) to denote the definition (if any) of a method with name m that one finds when starting a static method lookup in the class C. Like RA, CHA uses just one set variable R ranging over sets of methods. The constraints:
1. main R (main denotes the main method in the program)
2. For each method M, each virtual call site e.m( . . . ) occurring in M, and each class C∈SubTypes(StaticType(e)) where StaticLookup(C, m)=M':

(M∈R)υ(M'∈R).

Intuitively, the second constraint reads: "if a method is reachable, and a virtual method call e.m( . . . ) occurs in the body of that method, then every method with name m that is inherited by a subtype of the static type of e is also reachable."

Type Analysis (RTA)

CHA can be further extended to take class-instantiation information into account. The result is known as rapid type analysis (RTA).[5, 6] RTA uses both a set variable R ranging over sets of methods, and a set variable S which ranges over sets of class names. The variable S approximates the set of classes for which objects are created during a run of the program. The constraints:
1. main R (denotes the main method in the program)
2. For each method M, each virtual call site e.m( . . . ) occurring in M, and each class C∈SubTypes(StaticType(e)) where StaticLookup(C, m)=M':

(M∈R) . . . (C∈S)υ(M'∈R).

3. For each method M, and for each virtual "new C( )" occurring in M:

(M∈R)υ(C∈S).

Intuitively, the second constraint refines the corresponding constraint of CHA by insisting that C∈S, and that the third constraint reads: "S contains the classes that are instantiated in a reachable method."

RTA is easy to implement, scales well, and has been shown to compute call graphs that are significantly more precise than those computed by CHA.[6] There are several whole-program analysis systems that rely on RTA to compute call graphs (e.g., the JAX application extractor[40]). In the Section entitled "Results", RTA is used as the baseline against which the new call graph construction methods and process technique is compared, according to the present invention.

Related Work

Propagation-Based Algorithms

The idea of doing a propagation-based program analysis with one set variable for each expression is well known. This so-called monovariant style of analysis can be done in O(n³) time where n is the number of expressions. When the goal is to construct a call graph approximation in object-oriented or functional languages, then that style of analysis is known as 0-CFA, and when the goal is to do points-to analysis for C programs, then that style of analysis is often referred to as "Andersen's analysis".[3, 31] 0-CFA has been implemented for a variety of languages, including dynamically-typed object-oriented languages, functional languages, and statically-typed object-oriented languages, including Java.[1,3,11,19,21,28,29,31,33,38] The experience has been that the effectiveness of the approaches is language-dependent, and perhaps even programming-style dependent.

The idea of polyvariance is to associate more than one set variable with each expression, and thereby obtain better precision for each call site. Polyvariant analysis was pioneered by Sharir and Pnueli, and Jones and Muchnick.[25, 32] In the 1990s the study of polyvariant analysis has been intensive. Well known are the k-CFA algorithms of Shivers, the poly-k-CFA of Jagannathan and Weeks, and the Cartesian product algorithm of Agesen.[1, 2, 24, 33] A particularly simple polyvariant analysis was presented by Schmidt.[30] Frameworks for defining polyvariant analyses have been presented by Stefanescu and Zhou, Jagannathan and Weeks, and Nielson and Nielson.[23,26,36] Successful applications of polyvariant analysis include the optimizing compiler of Chambers et al, and of Hendren et al, and the partial evaluator of Consel.,[8,12,17] The inventors are not aware if these polyvariant approaches have been tried on programs of 100,000+ lines of code.

Algorithms not Based on Propagation

Calder and Grunwald investigated a particularly simple approach to inlining based on the unique name measure, that is, inlining in cases where there statically is a unique target for a given call site.[7, 20, 35]

A variation of 0-CFA is the unification-based approach, also known as the equality-base approach. This approach was pioneered by Steensgaard in the context of paints-to analysis for C.[20, 35] A comparison of Andersen's analysis and Steensgaard's analysis has been presented by Shapiro and Horwitz.[31] The unification-based approach is cheaper and less precise than the 0-CFA-style approach.

A broader comparison was given by Foster, Fähndrich, and Aiken; they compared both polymorphic versus monomorphic and equality-based versus inclusion-based points-to analysis.[15] Their main conclusion is that the monomorphic inclusion-based algorithm is a good choice because 1) it usually beats the polymorphic equality-based algorithm, 2) it is not much worse than the polymorphic inclusion-based algorithm, and 3) it is simple to implement because it avoids the complications of polymorphism.

An experimental comparison of RTA and a unification-based approach to call graph construction was carried out by DeFouw, Grove, and Chambers.[11] Their paper presents a family of algorithms that blend propagation and unification, thereby in effect dynamically determining which set variables to unify based on how propagation proceeds. Members of the family include RTA, 0-CFA, and a number of algorithms with cost and precision in between. These above algorithms although useful do not use static criteria to decide which set variables are to be merged and do not avoid analysis of the run-time stack.

Ashley also presented an algorithm that blends unification and propagation, in the setting of Scheme.[4]

Accordingly, there is a need in the prior art to overcome the above problems of (i) analysis of the stack; (ii) high computational overhead; and (iii) high complexity to implement, and to provide, a new process or method, computer readable medium and system to overcome the above problems.

SUMMARY OF THE INVENTION

Briefly, according to the present invention, disclosed is a method and system for A program storage device, readably by a machine, tangibly embodying instructions to perform method steps for constructing a call graph whereby for each method M, a set of types $S_M$ of objects that may occur in method M is determined for each field F, a set of types $S_F$ of objects is determined that may be stored in field F, the method comprising: determining the allocation sites inside the body of method M; determining the set of directly called methods M' inside the body of method M; and determining the set of virtually called methods M" inside the body of method M.

Implemented are several novel algorithms in the context of JAX, an application extractor for Java, and shown that they all scale to a 325,000-line program. One property of the present process technique is that it does not require simulation of the run-time stack, which makes them easy to implement and which helps efficiency. The present process technique associate a single distinct set with each class, method, and/or field (but not each expression) in an application. Surprisingly, for detecting unreachable methods, the inexpensive RTA does almost as well as the seemingly more powerful algorithms. However, if the number of edges in the call graph, or number of call sites with a single target is of issue, one of the techniques present in this invention obtains the current beast tradeoff between speed and precision.

In summary, the results for the most precise of the new process techniques look as follows:

The constructed call graphs tend to contain only slightly fewer method definitions (i.e., methods that have a body) when compared to RTA: up to 3.0% fewer method definitions, and 1.6% fewer method definitions on average, but in several cases significantly fewer edges (i.e., calling relationships between method definitions): up to 29.0% fewer edges, and 7.2% fewer edges on average.

An in-depth study of the constructed call graphs revealed that the most precise of the present algorithms and techniques uniquely resolves up to 26.3% of the virtual call sites that are deemed polymorphic by RTA (12.5% on average).

At a more detailed level, the results of the present invention illustrates that: (i) itemize associating a distinct set of types with each method in a class has a significantly greater impact on precision than using a distinct set for each field in a class, (ii) item unifying the sets for all methods in a class may result in a significant loss of accuracy, but that (iii) item unifying the sets for all fields in a class generally does not impact precision very much.

Associating a distinct set of types with each method in a class has a significantly greater impact on precision than using a distinct set for each field in a class.

The algorithms scale well: the running time is within an order of magnitude of a well-tuned RTA implementation in all cases. More precisely, the present invention runs up to 8.3 times slower than RTA, and the correlation of this "slowdown factor" with program size appears to be weak (for the largest benchmark, whereas in the present invention, the most expensive algorithm ran 5.0 times slower than RTA).

The algorithms do not require exorbitant amounts of space. All the measurements for the present invention were performed on a IBM ThinkPad 600E PC with 288 MB memory. None of the present benchmarks required more than 200 MB of heap space.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 3 is a table that shows, for each of the algorithms and techniques in the present invention implemented, the total number of types (instantiated classes), the average number of types available in each method body, and the latter as a percentage of the former, according to the present invention.

FIG. 4 is a table for each of the benchmarks, the number of methods in the call graphs computed by RTA, MTA, FTA, and XTA, according to the present invention.

FIG. 5 is a table illustrating the shows the results of the call graph edges according to the present invention.

FIG. 6 shows a table that classifies the virtual call sites in each of he benchmark applications as "unreached" (i.e., occurring in an unreached method), "monomorphic" (i.e., having a single target), or "polymorphic" (i.e., having multiple targets), according to the present invention.

FIG. 7 is a table which shows a detailed comparison of the call graphs constructed by RTA and MTA/FTA/XTA, for each of the benchmarks, according to the present invention.

FIG. 8 illustrates a table of the running time for the RTA, MTA, FTA, and XTA algorithms on each of the benchmarks (Measurements taken on an IBM ThinkPad 600E PC with a 300 Mhz processor and 288 MB of main memory, according to the present invention.

DETAILED DESCRIPTION OF AN EMBODIMENT

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Overview

The patent is divided into the following areas. New Algorithms, Implementation Issues, Results, Related Work, Future Work, Pseudo Code for New XTA Algorithm, Hardware and Software Implementation Issues.

Figures 1, 2:
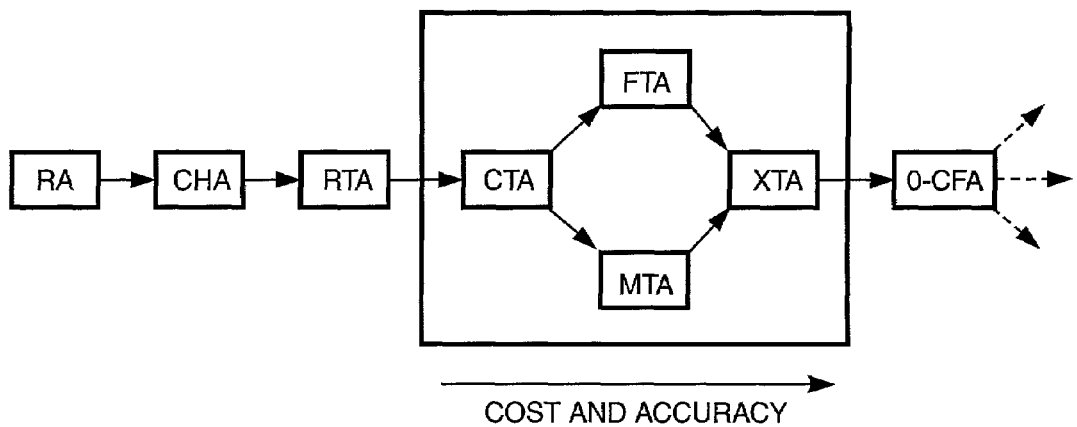
FIG. 1 is a schematic overview of the algorithms and their relationship to each other showing the cost and accuracy, according to the present invention.
FIG. 2 is a table that lists the benchmark applications that were used to evaluate the algorithm and present technique, and provides a number of relevant statistics, according to the present invention.

A set-based framework is used to present both some existing and some new algorithms. This enables easy comparison and help put the present invention in context. FIG. 1 shows the relationships between four new algorithms CTA, MTA, FTA, and XTA, and four well-known previous algorithms: RA (Reachability Analysis), CHA (Class Hierarchy Analysis), RTA (Rapid Type Analysis), and 0-CFA. The ordering from left to right corresponds to increased accuracy and increased cost. The increased cost stems from increased amounts of information used in resolving virtual method calls. The algorithms to the left of the new algorithms have been shown to scale well, whereas the scalability of 0-CFA remains doubtful. In Section entitled "Results" the scalability of the new algorithms is demonstrated.

New Algorithms

The new algorithms and new process techniques use multiple set variables that range over sets of classes. These set variables are associated with program entities such as classes, methods, and fields. Giving each program entity a more precise "local" view of the types of objects available then call sites are resolved more accurately.

Separate Set for Methods and Fields (XTA)

The first algorithm, which is called XTA, uses a distinct set variable $S_M$ for each method M, and a distinct set variable $S_x$ for each field x. This analysis is called XTA. The following notation ParamTypes(M) is used for the set of static types of the arguments of the method M (excluding method M's this pointer), and the notation ReturnType(M) for the static return type of M. The function SubTypes ( ) is extended to work on a set of types:

SubTypes(Y)=4 SubTypes(y)
yY

The following constraints define XTA:
1. (main R) (main denotes the main method in the program)
2. For each method M, each virtual call site e.m( . . . ) occurring in M, and each class C SubTypes(StaticType(e)) where StaticLookup (C. m)=M':

(MR) . . . ($CS_M$)

M'R . . .
   υ SubTypes(ParamTypes(M')) 3 $S_M$ $S_{M'}$ . . .
   SubTypes(ReturnType (M') 3 $S_M$ $S_{M'}$ . . .
   $CS_{M'}$ 3. For each method M, and for each "new C( )" occurring in M:

(MR)υ$CS_{M'}$.

4. For each method M in which a read of a field x occurs:

(MR)υ$S_x$ $S_x S_M$

5. For each method M in which a write of a field x occurs:

(MR)υ(SubTypes{StaticType(x)) 3 $S_M$ $S_x$

The second constraint refines the corresponding constraint of RTA by: (i) insisting that objects of the target class C are available in the local set $S_M$ associated with M; (ii) adding two inclusions that capture a flow of data from M to M', and from M' back to M, and (iii) stating that an object of type C (the "this" pointer) is available in M'. The third constraint refines the corresponding constraint of RTA by adding the class name C to just the set variable for the method M. The fourth constraint reflects a data flow from a field to a method body, and the fifth constraint reflects a data flow from a method body to a field, taking hierarchy information and creation point information into account.

Algorithms in the Space Between RTA and XTA

There is a spectrum of analyses between RTA and XTA. The following are exemplary embodiments:

CTA: The algorithm CTA uses a distinct set variable $S_C$ for each class C. Intuitively, the set variable $S_C$ unifies the flow information for all methods and fields. The constraints for CTA can be obtained by adding the following constraints to the definition of XTA:
1. If a class C defines a method M: $S_C=S_M$.
2. If a class C defines a field x: $S_C=S_x$.

MTA: The algorithm MTA uses a distinct set variable $S_C$ for each class C, and a set variable $S_x$ for every field x. Te set variable $S_C$ unifies the flow information for all methods (but not fields.) The constraints for MTA can be obtained by adding the following constraints to the definition of XTA:
1. If a class C defines a method M: $S_C=S_M$.

FTA: The algorithm FTA uses a distinct set variable $S_C$ for each class C, and a set variable $S_M$ for every method M. Intuitively; the set variable $S_C$ unifies the flow information for all fields (but not methods.) The constraints for MTA can be obtained by adding the following constraints to the definition of XTA:
1. If a class C defines a field x:

Many other possibilities exist. For example, one could unify the sets associated with fields in the same class if they have the same type.

Summary

The following is a summary of the algorithms and present techniques tested. For a given program, define:
C: the number of classes in the program.
M: the number of methods in the program.
F: the number of fields in the program.
In the following table, the first column gives the number of set variables used to approximate run-time values of expressions.

| NUMBER OF SETS | ALGORITHM |
| --- | --- |
| 0 | CHA |
| 1 | RTA |
| 𝒞 | CTA |
| 𝒞+ℱ | MTA |
| 𝒞+ℳ | FTA |
| ℳ+ℱ | XTA |

All of the algorithms and present techniques and also 0-CFA can be executed in $O(n^2 \times \mathcal{F})$ time, where n is the number of set variables.[28] 0-CFA can be viewed as an extension of XTA in the following way. Rather than using just one set variable for each method, 0-CFA uses one set variable for each argument and each expression that evaluates to an object, including references to objects on the run-time stack. The main problem for 0-CFA is that stack locations are unnamed in the Java virtual machine, so it seems necessary to first do a program transformation that names all the locations in some fashion, as done in various recent work.[21, 38, 41]

The lattice that was shown previously in FIG. 1 illustrates the relationships between the algorithms in terms of cost and accuracy. In the Section entitled "Related Work" discussed further are how these algorithms compare to other algorithms.

Implementation Issues

The previously described algorithms and present techniques in the Section entitled "Algorithms" have been implemented in the context of JAX, an application extractor for Java. Jikes Bytecode Toolkit (JikesBT) is a publically available class library from IBM for manipulating Java class files. See online URL (www.alphaworks.ibm.com/tech/jikesbt). JikesBT is used for reading in the Java class files that constitute an application, and for creating an internal representation of the classes in which the string-based references of the class file format are represented by pointer references. JAX uses RTA for constructing call graphs, and the present algorithms reuse several important data structures that were previously designed for RTA. Only about 4000 lines of new code is needed to implement the algorithms and present techniques described above.

The implementation performs the XTA algorithm in an iterative, propagation-based style. Three work-lists are associated with each program component (i.e., method or field) that keep track of "processed" types that have been propagated onwards from the component to other components, "current" types that will be propagated onwards in the current iteration, and "new" types that are propagated to the component in the current iteration and that will be propagated onwards in the next iteration.

The FTA and MTA algorithms are implemented by using a shared set for all the methods and fields in a class, respectively. Note that in the case of MTA (FTA) propagations between different methods (fields) in the same class are not needed. However, once a type is propagated to a method (field) in class C, the other methods (fields) in C still have to be revisited because onward propagations from those methods (fields) may have to take place.

A combination of array-based and hash-based data structures are used that allow efficient membership-test operations, element addition, and iteration through all elements. It is important to make al of these operations very efficient. Since the propagation of elements is filtered by types of method parameters, method return types, and types of fields, it is very important to efficiently implement subtype-tests. The approach relies on associating two integers with each class, corresponding to a pre-order and a post-order traversal of the class hierarchy. Using this numbering scheme, the existence of a subclass-relationship between two classes can be determined in unit time by comparing the associated numbers.

Applying the algorithms to realistic Java applications forced us to address several pragmatic issues:

Direct method calls. Direct method calls can be modeled using simple set-inclusions between the sets associated with the callee and the caller.

Arrays. Arrays are modeled as classes with one instance field that represents all of its elements. A method m is assumed to read an element from array A if: (i) an object of type A is propagated to m, and (ii) m contains an aaload byte code instruction. Similarly, a method m is assumed to write to A-element if: (i) an object of type A is propagated to m, and (ii) m contains an aastore instruction.

exception handling. The use of exception handling may cause nontrivial flow of types between methods, since exception objects may skip several stack frames before being caught. Any approach for tracking this flow of types precisely is fraught with complexity, and unlikely to be very worthwhile, since the number of types involved is likely to be small (only subtypes of java.lang.Throwable are involved), and the hierarchy of user-defined exception types is often not very large or complex. Therefore, the algorithms and techniques in the present invention use a single, global set of types that represents the run-time type of all expressions in the entire program whose static type is a subtype of java.lang.Throwable, and use that set to resolve all method calls on exception objects.

stack examination. A better precision along with greater efficiency can be achieved by examining the instruction that follows a method call (or field read). If this instruction is of the form checkcast C, an exception is thrown unless the run-time type of the object returned by the method) is a subtype of C. In such cases, the types being propagated from the callee to the caller can be restricted to subtypes of C. Similarly, if the instruction that follows a method call is a stack pop operation, the present invention can avoid propagating from the callee to the caller altogether. These situations occur frequently in the presence of polymorphic containers such as vectors and hash-tables.

incomplete applications. The present algorithms and present techniques described how the present algorithms construct call graphs for complete applications with a single entry point, any realistic implementation must deal with situations where applications extend classes in the standard libraries, call library methods, and override library methods that are invoked from outside the application. The basic approach is to associate a single set of objects $S_E$ with the "outside world" (i.e., all code outside the application). This set interacts with the other sets as follows:

If a method m calls a method m' outside the application, the algorithm and present technique can propagate ($S_m$ 3 ParamTypes(m')) to $S_E$. For virtual methods, any types passed via the this pointer are also propagated to $S_E$.

Whenever a method m writes to a field f outside the application, the algorithm and present technique can propagate ($S_m$ 3 Type (f)) to $S_E$. Read-accessing an external field causes similar flow in the opposite direction.

If a virtual method in the application overrides an external method m, a conservative assumption is that the external code contains a call to m'. The present invention uses the set $S_E$ to determine the set of methods in the application that may be invoked by the dynamic dispatch mechanism. For each such method m', the parameter types and return types of m is used to model the flow of objects between $S_E$ and $S_{m'}$.

The above technique in certain cases is unnecessarily conservative, because objects passed to a library method do not always pollute the global set $S_E$. Based on these observations, the implementation in one embodiment of the present invention incorporates two refinements to the above scheme:

For calls to certain methods in the standard libraries, the propagation to the set $S_E$ is unnecessary, because the objects passed to the method will not be the receiver of subsequent method calls. The constructor of class java.lang.Object is a prime example in this category. The inventors have identified about 25 heavily-called library methods for which calls can be ignored.

A separate set of objects $S_c$ can be associated with an external class C in cases where the objects passed to methods in C only interact with the other external classes in limited ways. For example, the algorithm and technique in the present invention can associate a distinct set with class java.util.Vector. Care has to be taken, because objects may flow from this class to other external classes (e.g., due to a call to java.util.Vector.elements( )). There are three other collection classes that modeled similarly.

reflection and dynamic loading. Nearly all of benchmarks in the present invention use dynamic loading and reflection. Since it is impossible for a static analysis to determine which classes may be accessed using these mechanisms, the analysis with information is manually supplied about where objects are created. Issues related to whole-program analysis in the presence of these mechanisms are discussed at length in the prior art.[39]

Results

For a range of benchmarks, five characteristics of the results of MTA, FTA, and XTA, with the results of RTA as a baseline are measured:

the number of types available per method, the number of reachable methods, the number of edges in the call graphs, the number monomorphic and polymorphic call sites, and the running times.

Of particular interest is the classification of call sites into monomorphic and polymorphic ones, and a detailed study is provided of how algorithms in the present invention improves on RTA. While the number of reachable methods decreases little, significant reductions have been found in the number of edges in the constructed call graphs for several of the benchmarks. More importantly, found is a significant increase in the number of monomorphic call sites when moving from RTA to, especially, XTA.

Benchmark Characteristics

FIG. 2 is a table 200 that lists the benchmark applications that were used to evaluate the algorithm and present technique, and provides a number of relevant statistics for each of them. These benchmarks cover a wide spectrum of programming styles and are publically available (except for it Mockingbird and Reservation System).

Hanoi is an interactive applet version of the well-known "Towers of Hanoi" problem, and is shipped with JAX. ICE Browser (See online URL www.icesoft.no) is a simple internet browser. Mockingbird (mBird) is a proprietary IBM tool for multi-language interoperability. It relies on, but uses only limited parts of, several large class libraries (including Swing, now part of JDK 1.2, and IBM's XML parser). Cinderella (See online URL www.cinderella.de) is an interactive geometry tool used for education and self-study in schools and universities. CindyApplet is an applet that allows users to interactively solve geometry exercises that were created with Cinderella. It is contained in the same class file archive as Cinderella. Lotus eSuite Sheet and Lotus eSuite Chart are interactive spreadsheet and charting applets, which are examples shipped with Lotus eSuite productivity suite (DevPack 1.5 version). (See online URL www.esuite.lotus.com). JavaFig (version 1.43 (22.02.99)) (See online URL tech-www.informatik.uni-hamburg.de/applets/javafig is a Java version of the xfig drawing program.) BLOAT (See online URL www.cs.purdue.edu/homes/hosking/pjama.html) is a byte-code optimizer developed at Purdue University. Version 6.3 of JAX itself was used as a benchmark. javac (See www.specbench.org) is the SPEC JVM 98 version Sun's javac compiler. The largest benchmark, Reservation System, which is an interactive front-end for an airline, hotel, and car rental reservation system developed by an IBM customer, and consists of approximately 325,000 lines of Java source code.

The table 200 in FIG. 2. illustrates the number of classes, methods, and fields for each of the benchmarks. The table 200 also shows the number of reference-typed fields in the application (i.e., fields whose type is a reference to a class), which is indicated between brackets in the "fields" column. The system in the present invention creates one set for each reference-typed field that is accessed from a reached method. Hence, this number is a bound on the number of field-sets that are created. Table 200 also shows the number of virtual call sites in each benchmark. For reasons described below, virtual calls to methods outside the application are excluded from this statistic.

Set Sizes

Statistics such as the number of reached methods and the percentage of uniquely resolved method calls are the measures by which call graph construction algorithms are traditionally compared. Since such measures all depend on the number of types available in a method, it is interesting to examine the average set of types available in each method as a more "absolute"' measure. FIG. 3 is a Table 300 that shows, for each of the algorithms implemented, the total number of types (instantiated classes), the average number of types available in each method body, and the latter as a percentage of the former. In the case of RTA, which uses only one set, the average number of types per method is the same as the total number of types.

Table 300 illustrates several interesting things:

There are only a very few cases where RTA determines a larger total number of types than the other algorithms.

Using MTA, an average 57.8% of all types is available in each method, a roughly two-fold reduction over RTA (where all types are available in each method). FTA does much better than MTA and determines that, on average, only 15.6% of all types are available in each method. XTA is better still, with 12.3% of the types being available on average.

While these reductions in average set size are substantial, it seems that there is still room for improvement. Computed on average, for Reservation System, about 200 types are available in each method when XTA is used. This number seems high, considering that the average size of a method is in the order of 15–20 lines of source code.

Reached Methods

FIG. 4 illustrates a table 400 shows, for each of the benchmarks, the number of methods in the call graphs computed by RTA, MTA, FTA, and XTA. Also shown are the percentage reductions of MTA, FTA, and XTA relative to RTA.

These statistics do not include abstract methods, which do not have a body, do not call other methods, and which cannot be the target of a dynamic dispatch. The rationale for excluding abstract methods has to do with the following observation: In cases where a virtual method m is called, but where m cannot be the target of a dynamic dispatch, it is possible to remove the m's body and make m into an abstract method without affecting program behavior (in fact, this is one of the optimizations performed by JAX). Therefore, counting abstract methods as first-class citizens makes it impossible to distinguish between call graphs that contain the same set of method headers, but different sets of method implementations. One could of course provide detailed statistics that include the number of non-abstract methods as well as the number of non-abstract methods, but this additional detail is not very worthwhile.

In summary:

MTA computes call graphs with 0 to 2.3% fewer method definitions than RTA (0.6% on average), FTA computes call graphs with 0 to 2.7% fewer method definitions than RTA (1.4% on average), and XTA computes call graphs with 0 to 3.0% fewer method definitions than RTA (1.6% on average).

Call Graph Edges

The next measure examined is the number of edges in the computed call graphs. In determining this number, each direct call site (i.e., a call that does not involve a dynamic dispatch) is counted as one, and each virtual call site as the number of "target" methods that may be invoked by a dynamic dispatch from that site. Multiple calls to the same method m within a method body are counted separately (although analyses in the present invention treats each of these calls similarly).

Since it is not known whether or not classes outside the application have been instantiated, it is not possible to accurately determine the number of targets of calls to virtual methods outside the application. Therefore, in performing these measurements, any calls to methods outside the application are ignored.

FIG. 5 is a table 500 which shows the results. It is clear that several of the new algorithms do eliminate substantially more edges than RTA does. The results can be summarized as follows:

MTA computes call graphs with 0 to 4.7% fewer edges than RTA (1.6% on average),

FTA computes call graphs with 0.1% to 26.7% fewer edges than RTA (6.6% on average), and XTA computes call graphs with 0.3% to 29.0% fewer edges than RTA (7.2% on average).

Uniquely Resolved Call Sites

One of the goals in the optimization of object-oriented programs is to find "monomorphic" virtual call sites from which only a single method can be invoked. Such call sites can be transformed into direct calls, and subsequently inlined and optimized further.

FIG. 6 shows a table 600 that classifies the virtual call sites in each of he benchmark applications as "unreached" (i.e., occurring in an unreached method), "monomorphic" (i.e., having a single target), or "polymorphic" (i.e., having multiple targets). Calls to methods outside the application are ignored again, since it cannot accurately be determine the number of targets in such cases. Using table 600, the following conclusions have been reached:

The percentage of virtual call sites that is unreached varies significantly from one benchmark to another. For example, only 3.0% of the virtual call sites in javac are unreached, whereas 72.0% of the virtual call sites in CindyApplet are unreached.

Restricting attention to reached virtual call sites, found is that all of the algorithms classify a vast majority of the call sites as monomorphic. Specifically:

RTA classifies between 3.4% and 19.4% of all call sites as polymorphic (7.8% on average).

MTA classifies between 3.3% and 19.4% of all call sites as polymorphic (7.7% on average).

FTA classifies between 2.8% and 19.4% of all call sites as polymorphic (7.2% on average).

XTA classifies between 2.8% and 19.3% of all call sites as polymorphic (7.0% on average).

In summary, RTA does a very good job in classifying virtual call sites as monomorphic. For the benchmarks examined in this patent, only 7.8% of all virtual call sites are classified as polymorphic (on average), which leaves little room for improvement. XTA classifies an average of 7.0% of all virtual call sites as polymorphic.

Detailed Comparison

FIG. 7 is a table 700, which shows a detailed comparison of the call graphs constructed by RTA and MTA/FTA/XTA, for each of the benchmarks. Each call site in the RTA call graph is classified as one of the following:

mono-to-unreached: virtual call sites that were resolved to a single target method in the RTA call graph, and that became unreached in the MTA/FTA/XTA call graphs (due to the fact that the method containing the call site in question became unreachable).

mono-to-mono: virtual call sites that were resolved to a single target method in both the RTA and the MTA/FTA/XTA call graphs.

poly-to-unreached: virtual call sites that were resolved to more than 1 target in the RTA call graph, and that became unreached in the MTA/FTA/XTA call graphs.

poly-to-mono: virtual call sites that were resolved to more than 1 target in the RTA call graph, but to a unique target in the MTA/FTA/XTA call graphs.

poly-to-poly: virtual call sites that were resolved to more than 1 target in both the RTA and the MTA/FTA/XTA call graphs.

To determine how much more accurate the MTA/FTA/XTA algorithms are when compared to RTA in relative terms, the following is observed:

Any call sites determined to be unreachable by MTA/FTA/XTA have no impact on an application's performance. After all, they are never executed.

Any call sites determined to be monomorphic by RTA will not be improved by a better algorithm (because they either stay monomorphic, or they become unreached).

Hence, what remains are the poly-to-mono and the poly-to-poly categories. The ratio between these categories reflects the relative improvement of MTA/FTA/XTA over RTA.

As an example, consider Reservation System, the largest benchmark. This application contains a total of 23,640 virtual call sites. If (i) all call sites are subtracted that are determined to be monomorphic by RTA, and (ii) all call sites are substracted that are determined to be unreachable by XTA, the result is 2,824 call sites that are determined to be polymorphic by RTA. XTA determines that 569 of these call sites are, in fact, monomorphic. Hence, XTA is capable of devirtualizing 569/2,824=20.1% of the call sites deemed polymorphic by RTA. Applying this line of reasoning to table 700, results in:

MTA finds a single target for up to 15.8% of the call sites deemed polymorphic by RTA (2.9% on average).

FTA finds a single target for up to 26.3% of the call sites deemed polymorphic by RTA (9.9% on average), and XTA finds a single target for up to 26.3% of the call sites deemed polymorphic by RTA (12.5% on average).

Running Times

FIG. 8 illustrates a table 800 of the running time for the RTA, MTA, FTA, and XTA algorithms on each of the benchmarks (Measurements taken on an IBM ThinkPad 600E PC with a 300 Mhz processor and 288 MB of main memory. The Sun JDK 1.1.8 VM is used with the just-in-time compiler developed at the IBM Tokyo Research Laboratory.[22] None of the benchmarks required more than 200 MB of heap space.) In summary, the XTA algorithm is up to 8.3 times slower than RTA. The correlation between the slowdown factor and program size appears to be weak: XTA is only 5.0 times slower than RTA on Reservation System. The present invention should scale well and have no problems with million-line programs.

Surprisingly, the MTA and FTA algorithms were in several instances somewhat slower than XTA. To date the source of these slowdowns has not been determined. A possible explanation is that the increased number of types available in a method results in additional work in resolving the call sites within that method. However, it seems unlikely that this would negate all the benefits from a decreased number of propagations between sets. An efficient implementation of MTA/FTA (e.g., using techniques by Fähndrich et al is expected to be significantly more efficient than XTA.[13]

Assessment

The experiments have demonstrated that it is feasible to construct propagation-based call graph construction algorithms that use more than a single set of objects to approximate the run-time values of expressions. Regarding the precision of these algorithms, the following is observed:

The algorithms are slightly more accurate than RTA in terms of the number of reached methods.
  In several cases, the algorithms are significantly more accurate than RTA in terms of the number of edges between the methods in the call graph.
  More importantly, the reduction in the number of edges is to a significant extent derived from call sites that are classified as polymorphic by RTA, but as monomorphic call sites by the algorithms and techniques in the present invention.

With respect to the number of sets one should use, it is found that:

Using a distinct set for each method in the program is useful, because it improves accuracy.
  Using a unified set to represent the fields in a class does not lead to a great loss of accuracy.

In light of the improved results of XTA over FTA in some cases, the XTA algorithm is the best choice. If heap space is at a premium, FTA offers reduced space consumption in exchange for a slight loss of precision. MTA seems a poor choice since it computes call graphs that have roughly the same precision as those computed by RTA, but it is more complex to implement. Although no data for CTA is presented herein, CTA is less accurate than MTA, and the same arguments can be made to argue why it is not a very good choice.

Additional Considerations

A comparison of the algorithms and present techniques, 0-CFA, and the settings of Sundaresan et al. or Ishizaki et al. seems to require a framework in which a program transformation names all stack locations.[21,38] This would be a significant extension to the framework of the present invention so it may be easier to do a comparison in the settings of Sundaresan and Isizaki.[21,38] Questions that could be addressed by such a comparison include: 1) does 0-CFA use significantly more time and space than the algorithms and techniques in the present invention for large benchmarks? 2) is the potential extra precision of 0-CFA worth the increased cost? And 3) when used in a compiler for devirtualization of monomorphic calls, does 0-CFA give significantly better speedups than the algorithms and techniques in the present invention? Answers may well shed more light on which algorithm to choose. Perhaps 0-CFA needs to be a fair bit better than the other algorithms before it becomes tempting to implement the program transformation that enables 0-CFA for Java bytecodes.

While adding Hindley-Milner polymorphism seems not to be worthwhile, initial experiments have been conducted with the use of data-polymorphism.[18,27] The idea is well known: treat each distinct allocation site as a separate class, and keep the fields in these artificial classes distinct.[18,27] Similarly, distinct sets may be used when methods are invoked on objects of the same type but allocated at different sites. Data-polymorphism has the potential of significantly increasing the cost (more elements have to be propagated, and the number of distinct sets may increase as well). However, accuracy may improve as well because unrelated instantiations of the same type are kept separate, thereby leading to a more precise analysis of their fields.

Pseudo-Code for the XTA Algorithm

The set constraints described in the present invention can be interpreted by "solvers" such as BANE which was developed at the University of California at Berkeley. The following pseudo-code, which is understandable to one of average skill in the art, is given as one possible embodiment of the XTA algorithm described in the present invention. It is important to note that the pseudo-code although complete, many pragmatic issues such as direct method calls, library usage, and class initializers are not addressed and can be found in several prior art references. Moreover, the pseudo-code describes a "naive" implementation in which no attempt has been made to make the code efficient e.g., by avoiding redundant propagations.

The following conventions are used for the data structures used in the pseudo-code:

associated with each method M is a set Types(M) denoting the set of types computed for that method
  associated with each field F is a set Types(F) denoting the set of types computed for that field
  variable MethodsToScan contains a worklist of methods whose instructions will be scanned in the next iteration of the algorithm. Initially, this is only the program's main method.
  variable MethodPairs contains pairs <M,T> where M is a method and T is a type that will be propagated to that method in the next iteration
  variable FieldPairs contains pairs <F,T> where F is a field and T is a type that will be propagated to that field in the next iteration
  variable Nodes contains the set of nodes in the computed call graph. A node is identified by a method here.
  variable Edges contains the set of edges in the computed call graph. An edges is a pair <S,M> where S is a call site and M a method.
  associated with each method M are sets:
    ReadFields(M)
    WrittenFields(M)
    VirtualCallSites(M)
    indicating the fields read by M, the fields written by M, and the virtual call sites in M, respectively.

Figure 9:
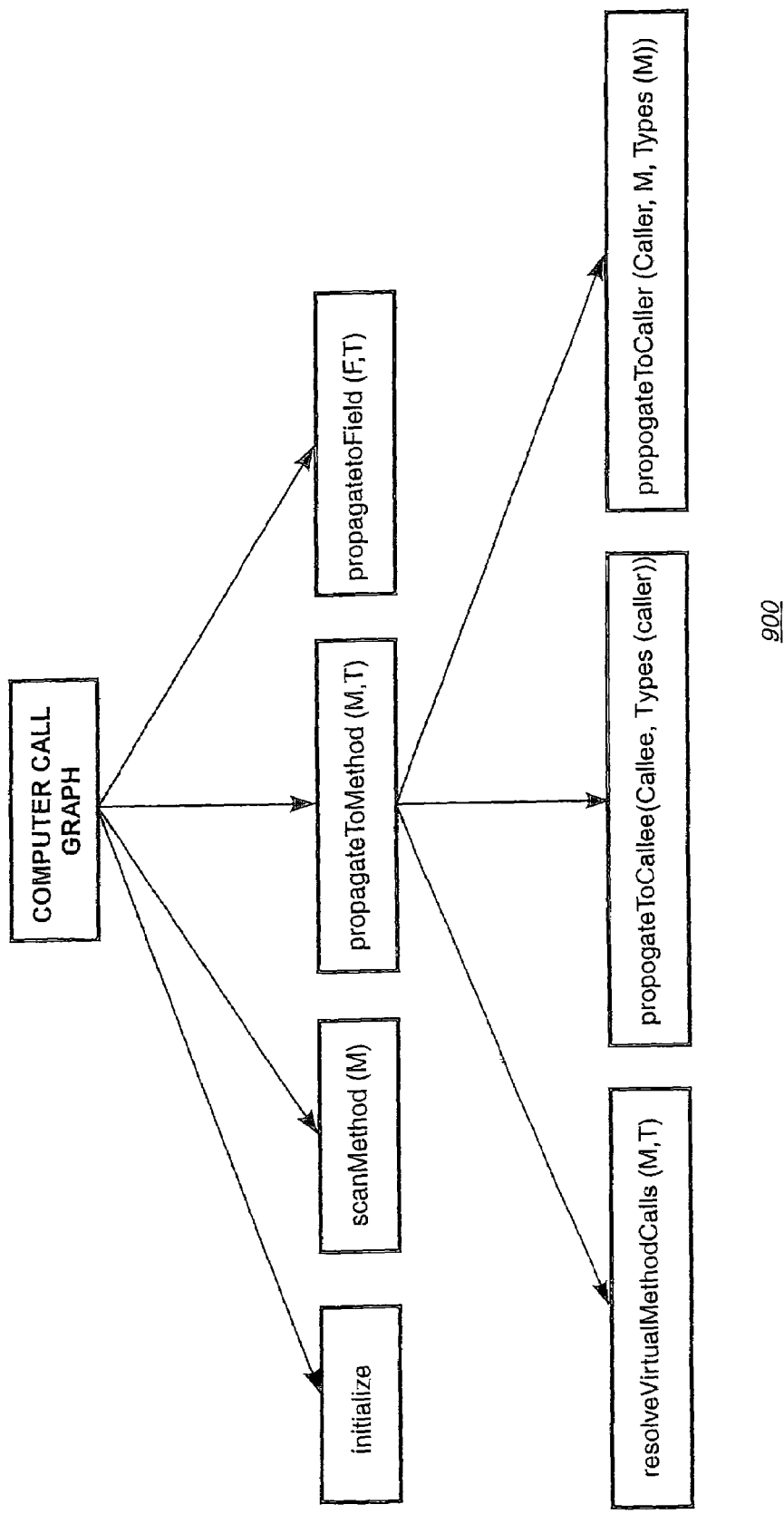
FIG. 9 is a high-level block diagram of the procedures used in the Pseudo-code, according to the present invention.

FIG. 9 is a high-level block diagram 900 of the procedures used in the Pseudo-code, according to the present invention. The compute Call Graph Pseudo-Code as described below contains eight procedures. In this exemplary embodiment, the pseudo-code is arranged into eight procedures as follows:

```
PROCEDURE computeCallGraph(Program P)
BEGIN
  CALL initialize();
  WHILE (MethodsToScan is not empty OR
    MethodPairs is not empty OR
    Field Pairs is not empty) DO
    FOR each method M in MethodsToScan DO
      CALL scanMethod(M);
      remove M from MethodsToScan;
    END FOR
    FOR each pair <M, T> in MethodPairs DO
      CALL propagateToMethod(M, T);
      remove <M, T> from MethodPairs;
```

```
        END FOR
        FOR each pair <F, T> in FieldPairs DO
            CALL propagateToField(F, T);
            remove <F, T> from FieldPairs;
        END FOR
    END WHILE
    RETURN <Nodes, Edges>;
END PROCEDURE
------------------------------------------------------------------
// Initializations.
PROCEDURE initialize()
BEGIN
    let main be the main procedure in P;
    mark main "Reached";
    Nodes := {main };
    Edges := {};
    MethodsToScan = { main };
    Method Pairs = {};
    FieldPairs = {};
    FOR each method M DO
        Types(M) = {};
    END FOR
    FOR each field F DO
        Types(F) = {};
    END FOR
END PROCEDURE
------------------------------------------------------------------
// Scan the method's body to detect read/written fields,
// call sites, and allocation sites.
PROCEDURE scanMethod(method M)
BEGIN
    determine the set ReadFields(M) of fields read by M;
    determine the set WrittenFields(M) of fields written by M;
    determine the set VirtualCallSites(M) of virtual call sites in M;
    FOR each allocation site "new T" in M DO
        IF (<M, T> does not occur in MethodPairs) THEN
            add <M, T> to MethodPairs;
        END IF
    END FOR
    FOR each field F in ReadFields(M) DO
        FOR each type T in Types(F) DO
            IF (<M, T> does not occur in MethodPairs) THEN
                add <M, T> to MethodPairs;
            END IF
        END FOR
    END FOR
END PROCEDURE
------------------------------------------------------------------
// Propagate type T to method M.
// Propagate the type to:
// - fields written by M,
// - methods called by M,
// - methods that call M
// as appropriate.
PROCEDURE propagateToMethod(method M, type T)
BEGIN
    add T to Types(M);
    CALL resolveVirtualMethodCalls(M, T);
    FOR each field F in Written Fields(M) DO
        let X be the type of F;
        let S be the set of types in Types(M) that are subtypes of X;
        FOR each type U in S DO
            IF (U not in TYPES(F) and <F, U> not in FieldPairs) THEN
                add <F, U> to FieldPairs;
            END IF
        END FOR
    END FOR
    FOR each edge <CallSite, Callee> in Edges
        such that CallSite occurs in M DO
        let Caller be the method containing CallSite;
        CALL propagateToCallee(Callee, Types(Caller));
    END FOR
    FOR each edge <CallSite, M> in Edges DO
        let Caller be the method containing CallSite;
        CALL propagateToCaller(Caller, M, Types(M));
    END FOR
END PROCEDURE
------------------------------------------------------------------
// Determine the methods that can be reached from a
// given method's virtual call sites, for a given type.
// Add the appropriate call graph edges.
// Add any newly reached methods to the worklist.
PROCEDURE resolveVirtualMethodCalls(method M, type T)
BEGIN
    FOR each site S in VirtualCallSites(M) DO
        let M' be the method referenced at S;
        IF (T is a subtype of the class in which M' occurs) THEN
            let M" = StaticLookup(T, M');
            IF (M" is not marked "Reached") THEN
                mark M" "Reached";
                add M" to Nodes;
                add M" to MethodsToScan;
            END IF
            IF (Edges does not contain an edge S->M") THEN
                add edge S->M" to Edges;
                propagateToCallee(M, M", Types(M));
                propagateToCaller(M, M", Types(M"));
            END IF
        END IF
    END FOR
END PROCEDURE
------------------------------------------------------------------
// Propagate from caller to callee, filter using parameter types
// Propagate from caller to callee, filter using "this" pointer:
// types for which StaticLookup(T, M') == M' holds.
PROCEDURE propagateToCallee(method Callee, typeset V)
    FOR each type T in V DO
        IF (T is a subtype of the type of a parameter of Callee) THEN
            IF ((T does not occur in Types(Callee) AND
                (<Callee, T> does not occur in Method Pairs)) THEN
                add <Callee, T> to MethodPairs;
            END IF
        END IF
    END FOR
    FOR each type T in V DO
        IF (StaticLookup(T, Callee) == Callee) THEN
            IF ((T does not occur in Types(Callee) AND
                (<Callee, T> does not occur in Method Pairs)) THEN
                add <Callee, T> to MethodPairs;
            END IF
        END IF
    END FOR
END PROCEDURE
------------------------------------------------------------------
// Propagate from callee to caller, filter using return type
PROCEDURE propagateToCaller(method Caller, method Callee, typeset V)
BEGIN
    FOR each type T in V DO
        IF (T is a subtype of the return type of Callee) THEN
            IF ((T does not occur in Types(Caller) AND
                (<Caller, T> does not occur in MethodPairs)) THEN
                add <Caller, T> to MethodPairs;
            END IF
        END IF
    END FOR
END PROCEDURE
------------------------------------------------------------------
PROCEDURE propagateToField(field F, type T)
BEGIN
    add T to Types(F);
    FOR each method M such that F occurs in ReadFields(M) DO
        IF (T does not occur in Types(M) AND
            <M, T> does not occur in MethodPairs) THEN
            add <M, T> to MethodPairs;
        END IF
    END FOR
END PROCEDURE
------------------------------------------------------------------
```

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

References Used Herein

The following references are a list of references that have been referenced throughout the present invention. These references are hereby incorporated by reference in their entirety.

1. Agesen, O. Constraint-based type inference and parametric polymorphism. *Proceedings of the First International Static Analysis Symposium (SAS'94)* (September 1994), 78–100. Springer-Verlag LNCS vol. 864.
2. Agesen, O. *Concrete Type Inference: Delivering Object-Oriented Applications.* PhD thesis, Stanford University, December, 1995. Appeared as Sun Microsystems Laboratories Technical Report SMLI TR-96-52.
3. Andersen, L. O. Self-applicable C program specialization. In *Proceedings of PEPM'92, Workshop on Partial Evaluation and Semantics-Based Program Manipulation* (June 1992), pp. 54–61. (Technical Report YALEU/DCS/RR-909, Yale University).
4. Ashley, J. M. A practical and flexible flow analysis for higher-order languages. In *Proceedings of POPL'96, 23nd Annual SIGPLAN-SIGACT Symposium on Principles of Programming Languages* (1996), pp. 84–194.
5. Bacon, D. F. *Fast and Effective Optimization of Statically Typed Object-Oriented Languages.* PhD thesis, Computer Science Division, University of California, Berkeley, December 1997. Report No. UCB/CSD-98-1017.
6. Bacon, D. F., and Sweeney, P. F. Fast static analysis of C++ virtual function calls. In *Proceedings of the Eleventh Annual Conference on Object-Oriented Programming Systems, Languages, and Applications (OOPSLA'96)* (San Jose, Calif. 1996), pp. 324–341. *SIGPLAN Notices* 31(10).
7. Calder, B., and Grunwald, D. Reducing indirect function call overhead in C++ programs. *Conference Record of the Twenty-First ACM Symposium on Principles of Programming Languages* (January, 1994), 397–408.
8. Consel, C. A tour of Schism: A partial evaluation system for higher-order applicative languages. In *Proceedings of PEPM'93, Second ACM SIGPLAN Symposium on Partial Evaluation and Semantics-Based Program Manipulation* (1993), pp. 145–154.
9. Dean, J., and Chambers, C. Optimization of object-oriented programs using static class hierarchy analysis. Tech. Rep. 94-12-01, Department of Computer Science, University of Washington at Seattle, December, 1994.
10. Dean, J., Grove, D., and Chambers, C. Optimization of object-oriented programs using static class hierarchy analysis. In *Proceedings of the Ninth European Conference on Object-Oriented Programming (ECOOP'95)* (Aarhus, Denmark, August 1995), W. Olthoff, Ed., Springer-Verlag, pp. 77–101.
11. DeFouw, G., Grove, D., and Chambers, C. Fast interprocedural class analysis. In *Conference Record of the Twenty-Fifth ACM Symposium on Principles of Programming Languages* (San Diego, Calif., January 1998), pp. 222–236.
12. Emami, M., Ghiya, R., and Hendren, L. J. Context-sensitive interprocedural points-to analysis in the presence of function pointers. In *Proceedings of ACM SIGPLAN 1994 Conference on Programming Language Design and Implementation* (1994), pp. 242–256.
13. Fahndrich, M., and Aiken, A. Program analysis using mixed term and set constraints. In *Proceedings of SAS'97, International Static Analysis Symposium* (1997), Springer-Verlag (*LNCS*), pp. 114–126.
14. Fähndrich, M., Foster, J. S., Su, Z., and Aiken, A. Partial online cycle elimination in inclusion constraint graphs. In Proceedings of ACM SIGPLAN 1998 Conference on Programming Language Design and Implementation (1998), pp. 85–96.
15. Foster, J. F., Fähndrich, M., and Aiken, A. Polymorphic versus monomorphic flow-insensitive points-to analysis for C. In *Proceedings of SAS 2000, 7th Static Analysis Symposium* (2000), J. Palsberg, Ed., pp. 175–198.
16. Goldberg, A., and Robson, D. *Smalltalk-80-The Language and its Implementation.* Addison-Wesley, 1983.
17. Grove, D., DeFouw, G., Dean, J., and Chambers, C. Call graph construction in object-oriented languages. In *Proceedings of the Twelfth Annual Conference on Object-Oriented Programming Systems, Languages, and Applications (OOPSLA >97)* (Atlanta, Ga., 1997), pp. 108–124. *SIGPLAN Notices* 32(10).
18. Grove, D., DeFouw, G., Dean, J., and Chambers, C. Call graph construction in object-oriented languages. In

*Proceedings of OOPSLA >97, ACM SIGPLAN Conference on Object-Oriented Programming Systems, Languages, and Applications* (1997), pp. 108–124. *SIGPLAN Notices* 32(10).

19. Heintze, N. Set-based analysis of ML programs. In *Proceedings of ACM Conference on LISP and Functional Programming* (1994), pp. 306–317.

20. Henglein, F. Dynamic typing. In *Proceedings of ESOP'92, European Symposium on Programming* (1992), Springer-Verlag (*LNCS* 582), pp. 233–253.

21. Ishizaki, K., Kawahito, M., Yasue, T., Komatsu, H., and Nakatani, T. A study of devirtualization techniques for a Java just-in-time compiler. In *Proceedings of the Fifteenth Annual Conference on Object-Oriented Programming Systems, Languages, and Applications* (*OOPSLA'00*) (Minneapolis, Minn., 2000).

22. Ishizaki, K., Kawahito, M., Yasue, T., Takeuchi, M., Ogasawara, T., Suganuma, T., Onodera, T., Komatsu, H., Nakatani, T. Design, implementation, and evaluation of optimizations in a just-in-time compiler. In *Proceedings of the ACM SIGPLAN JavaGrande Conference* (San Francisco, Calif., June 1999).

23. Jagannathan, S., and Weeks, S. A unified treatment of flow analysis in higher-order languages. In *Proceedings of POPL'95, 22nd Annual SIGPLAN-SIGACT Symposium on Principles of Programming Languages* (1995), pp. 393–407.

24. Jagannathan, S., and Wright, A. Effective flow analysis for avoiding run-time checks. In *Proceedings of SAS'95, International Static Analysis Symposium* (Glasgow, Scotland, September 1995), Springer-Verlag (*LNCS* 983).

25. Jones, N., and Muchnick, S. A flexible approach to interprocedural data flow analysis of programs with recursive data structures. In Ninth Symposium on Principles of Programming Languages (1982), pp. 66–74.

26. Nielson, F., and Nielson, H. R. Infinitary control flow analysis: A collecting semantics for closure analysis. In *Proceedings of POPL'97, 24th Annual SIGPLAN—SIGACT Symposium on Principles of Programming Languages* (1997), pp. 332–345.

27. Oxhøj, N., Palsberg, J., and Schwartzbach, M. I. Making type inference practical. In *Proceedings of ECOOP'92, Sixth European Conference on Object-Oriented Programming* (Utrecht, The Netherlands, July 1992), Springer-Verlag (*LNCS* 615), pp. 329–349.

28. Palsberg, J., and Schwartzbach, M. *Object-Oriented Type Systems*. John Wiley & Sons, 1993.

29. Palsberg, J., and Schwartzbach, M. I. Object-oriented type inference. In *Proceedings of OOPSLA'91, ACM SIGPLAN Sixth Annual Conference on Object-Oriented Programming Systems, Languages and Applications* (Phoeniz, Ariz., October 1991), pp. 146–161.

30. Schmidt, D. Natural-semantics-based abstract interpretation. In *Proceedings of SAS'95, International Static Analysis Symposium*. (Glasgow, Scotland, September 1995), Springer-Verlag (*LNCS* 983).

31. Shapiro, M., and Horwitz, S. Fast and accurate flow-insensitive points-to analysis. In *Conference Record of the Twenty-Fourth ACM Symposium on Principles of Programming Languages* (Paris, France, 1997), pp. 1–14.

32. Sharir, M., and Pnueli, A. Two approaches to interprocedural data flow analysis. In *Program Flow Analysis, Theory and Applications*, S. Muchnick and N. Jones, Eds. 1981.

33. Shivers, O. *Control-Flow Analysis of Higher-Order Languages*. PhD thesis, CMU, May, 1991. CMU-CS-91-145.

34. Srivastava, A. Unreachable procedures in object oriented programming. *ACM Letters on Programming Languages and Systems*, 1, 4 (December 1992), pp. 355–364.

35. Steensgaard, B. Points-to analysis in almost linear time. In *Proceedings of the Twenty-Third ACM Symposium on Principles of Programming Languages* (St. Petersburg, Fla., January, 1996), pp. 32–41.

36. Stefanescu, D., and Zhou, Y. An equational framework for flow analysis of higher-order functional programs. In *Proceedings of ACM Conference on LISP and Functional Programming* (1994), pp. 318–327.

37. Su, Z., Fahndrich, M., and Aiken, A. Projection merging: Reducing redundancies in inclusion constraint graphs. In *Proceedings of POPL'00, 27nd Annual SIGPLAN—SIGACT Symposium on Principles of Programming Languages* (2000), pp. 81–95.

38. Sundaresan, V., Hendren, J., Razafimahefa, C., Vallée-Rai, R., Lam, P., Gagnon, E., and Godin, C. Practical virtual method call resolution for Java. In *Proceedings of the Fifteenth Annual Conference on Object-Oriented Programming Systems, Languages, and Applications* (*OOPSLA'00*) (Minneapolis, Minn.), 2000.

39. Sweeney, P. F., and Tip, F. Extracting library-based object-oriented applications. In *Proceedings of the Eighth International Symposium on the Foundations of Software Engineering* (FSE-8) (November 2000). To appear. A previous version of this paper appeared as IBM Research Report RC 21596, November 1999.

40. Tip, F., Laffra, C., Sweeney, P. F., and Streeter, D. Practical experience with an application extractor for Java. In *Proceedings of the Fourteenth Annual Conference on Object-Oriented Programming Systems, Languages, and Applications* (*OOPSLA* '99) (Denver, Colo.), 1999, pp. 292–305, *SIGPLAN Notices* 34(10).

41. Vallé-Rai, R., Gagnon, E., Hendren, L., Lam, P., Pominville, P., and Sundaresan, V. Optimizing java bytecode using the soot framework: Is it feasible? In *Proceedings of CC'00, International Conference on Compiler Construction* (2000), Springer-Verlag (*LNCS*).

42. Vitek, J., Horspool, R. N., and Krall, A. Efficient type inclusion tests. In *Proceedings of OOPSLA >97, ACM Systems, Languages and Applications* (1997), pp. 142–157. *SIGPLAN Notices* 32(10).

Non-limiting Examples Shown

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A program storage device, readable by a machine, tangibly embodying programming instructions to perform method steps for constructing a set of types occurring within a method, the programming instructions comprising:

selecting a program P for constructing a call graph representation thereof;

wherein the program P contains zero or more fields $F_F$ and at least two methods $M_M$;

wherein each method $M_1$ in $M_M$ has a single body B;

constructing for each method M in $M_M$, a set of types $S_M$ of objects which occur therein;

constructing for each field F in $F_F$, a set of types $S_F$ of objects stored therein;

identifying one or more allocation sites inside the body B of each of method M;

determining a set of methods M' that are directly called within the body B of each method M and propagating types from the set of types $S_{M'}$ to the set of types $S_M$ and from of the set of types $S_M$ to the set of types $S_{M'}$;

determining a set of methods M" that are virtually called within the body B of each method M and propagating types from the set of types $S_{M''}$ to the set of types $S_M$ and from the set of types $S_M$ to the set of types $S_{M''}$;

determining a set of fields F that are read in the body B of each method M, and propagating types from the set of types $S_F$ to the set of types $S_M$; and written in the body B of each method M, and propagating types from the set of types $S_M$ to the set of types $S_F$.

2. The program storage device according to claim 1, further comprising the programming instructions of:

determining the set of all types T that are allocated in the body of method M, and adding each element of the set of all types T to the set of types $S_M$.

3. The program storage device according to claim 2, further comprising the programming instructions of:

for each direct call to a methods M' in the body B of the method M performing the steps of:

adding any type that occurs in the set of types $S_M$ and that is a subtype of the type of a parameter of the methods M' to the set of types $S_{M'}$; and adding any type that occurs in the set of types $S_{M'}$ and that is a subtype of a return type of the methods M' to the set of types $S_M$.

4. The program storage device according to claim 3, further comprising the programming instructions of:

for each virtual call to the methods M' in the body B of the method M:

using the set of types $S_M$, determine each of the methods M" that may be reached by a dynamic dispatch;

adding any type that occurs in the set of types $S_M$ and that is a subtype of the type of a parameter of the methods M" to athe set of types $S_{M''}$;

adding any type that occurs in the set of types $S_{M''}$ and that is a subtype of the return type of the methods M" to the set of types $S_M$.

5. The program storage device according to claim 4, further the programming instructions of:

for each field F read by the method M, adding any type that occurs in the set of types $S_F$ to the set of types $S_M$; and for each field F with the set of all types T written by the method M, adding any type that occurs in the set of types $S_M$ and that is a subtype of the set of all types T to the set of types $S_F$.

6. The program storage device according to claim 1, further comprising:

constructing a call graph representation;

wherein for each method $M_2$ in $M_M$, the call graph representation includes a corresponding node; and wherein the call graph representation includes zero or more edges corresponding to connections between two or more of nodes.

7. The program storage device according to claim 6, further comprising the programming instructions of:

using the call graph, as previously constructed, in a reporting tool to report call graph information to a user.

8. The program storage device according to claim 6, further comprising the programming instructions of:

using the call graph, as previously constructed, in a compiler as a basis for performing optimizations such as inlining.

9. A computer program product for constructing a set of types occurring within a method, the computer program product comprising:

a storage medium readable by a processing circuit and storing instructions for execution by the processing circuit for performing a method comprising:

selecting a program P for constructing a call graph representation thereof;

wherein the program P contains zero or more fields $F_F$ and at least two methods $M_M$;

wherein each method $M_1$ in $M_M$ has a single body B;

wherein for each method $M_2$ in $M_M$, the call graph representation includes a corresponding node;

wherein the call graph representation includes zero or more edges corresponding to connections between two or more of nodes;

constructing for each method M in $M_M$, a set of types $S_M$ of objects which occur therein;

constructing for each field F in $F_F$, a set of types $S_F$ of objects stored therein;

identifying one or more allocation sites inside the body B of each of method M;

determining a set of methods M' that are directly called within the body B of each method M and propagating types from the set of types $S_{M'}$ to the set of types $S_M$ and from of the set of types $S_M$ to the set of types $S_{M'}$;

determining a set of methods M" that are virtually called within the body B of each method M and propagating types from the set of types $S_{M''}$ to the set of types $S_M$ and from of the set of types $S_M$ to the set of types $S_{M''}$;

determining a set of fields F that are read in the body B of each method M, and propagating types from the set of types $S_F$ to the set of types $S_M$; and written in the body B of each method M, and propagating types from the set of types $S_M$ to the set of types $S_F$.

10. The computer program product according to claim 9, further comprising:

determining the set of all types T that are allocated in the body of method M, and adding each element of the set of all types T to the set of types $S_M$.

11. A method for constructing a set of types occurring within a method, the method comprising:

selecting a program P for constructing a call graph representation thereof;

wherein the program P contains zero or more fields $F_F$ and at least two methods $M_M$;

wherein each method $M_1$ in $M_M$ has a single body B;

constructing for each method M in $M_M$, a set of types $S_M$ of objects which occur therein;

constructing for each field F in $F_F$, a set of types $S_F$ of objects stored therein;

identifying one or more allocation sites inside the body B of each of method M;

determining a set of methods M' that are directly called within the body B of each method M and propagating types from a set of types $S_{M'}$ to the set of types $S_M$ and from of the set of types $S_M$ to the set of types $S_{M'}$;

determining a set of methods M" that are virtually called within the body B of each method M and propagating types from a set of types $S_{M''}$ to the set of types $S_M$ and from of the set of types $S_M$ to the set of types $S_{M''}$;

determining a set of fields F that are
- read in the body B of each method M, and propagating types from the set of types $S_F$ to the set of types $S_M$; and
- written in the body B of each method M, and propagating types from the set of types $S_M$ to the set of types $S_F$.

12. The method according to claim 11, further comprising:

determining the set of all types T that are allocated in the body of method M, and adding each element of the set of all types T to the set of types $S_M$.

13. The method according to claim 12, further comprising:

for each direct call to a method M' in the body B of the method M performing the steps of:
- adding any type that occurs in the set of types $S_M$ and that is a subtype of a type of a parameter of the method M' to the set of types $S_{M'}$; and
- adding any type that occurs in the set of types $S_{M'}$ and that is a subtype of a return type of the method M' to the set of types $S_M$.

14. The method according to claim 13, further comprising:

for each virtual call to the method M' in the body B of the method M:

using the set of types $S_M$, determine each of the methods M" that may be reached by a dynamic dispatch:
- adding any type that occurs in the set of types $S_M$ and that is a subtype of a type of a parameter of the method M" to the set of types $S_{M''}$;
- adding any type that occurs in the set of types $S_{M''}$ and that is a subtype of the return type of the method M" to the set of types $S_M$.

15. The method according to claim 14, further comprising:

for each field F read by the method M, add any type that occurs in the set of types $S_F$ to the set of types $S_M$; and for each field F with the set of all types T written by the method M, add any type that occurs in the set of types $S_M$ and that is a subtype of the with set of all types T to the set of types $S_F$.

16. The method according to claim 11, further comprising the step of:

using the call graph, as previously constructed, in a compiler as a basis for performing optimizations such as inlining.

17. The method according to claim 11, further comprising:

constructing a call graph representation;

wherein for each method $M_2$ in $M_M$, the call graph representation includes a corresponding node; and wherein the call graph representation includes zero or more edges corresponding to connections between two or more of nodes.

18. The method according to claim 17, further comprising the step of:

using the call graph, as previously constructed, in a reporting tool to report call graph information to a user.

* * * * *

UNITED STATES PATENT AND TRADEMARK OFFICE
CERTIFICATE OF CORRECTION

PATENT NO. : 7,003,507 B2
DATED : February 21, 2006
INVENTOR(S) : Frank Tip et al.

It is certified that error appears in the above-identified patent and that said Letters Patent is hereby corrected as shown below:

<u>Column 23,</u>
Lines 32, 36, 38, 42, 49 and 51, change "methods" to -- method --.
Line 49, delete "a".

Signed and Sealed this

Twenty-third Day of May, 2006

JON W. DUDAS
*Director of the United States Patent and Trademark Office*